July 20, 1954     J. S. KILPATRICK     2,684,414
FLUID INDICATOR FOR HYDRAULIC BRAKING SYSTEMS
Filed Jan. 24, 1952     2 Sheets-Sheet 1
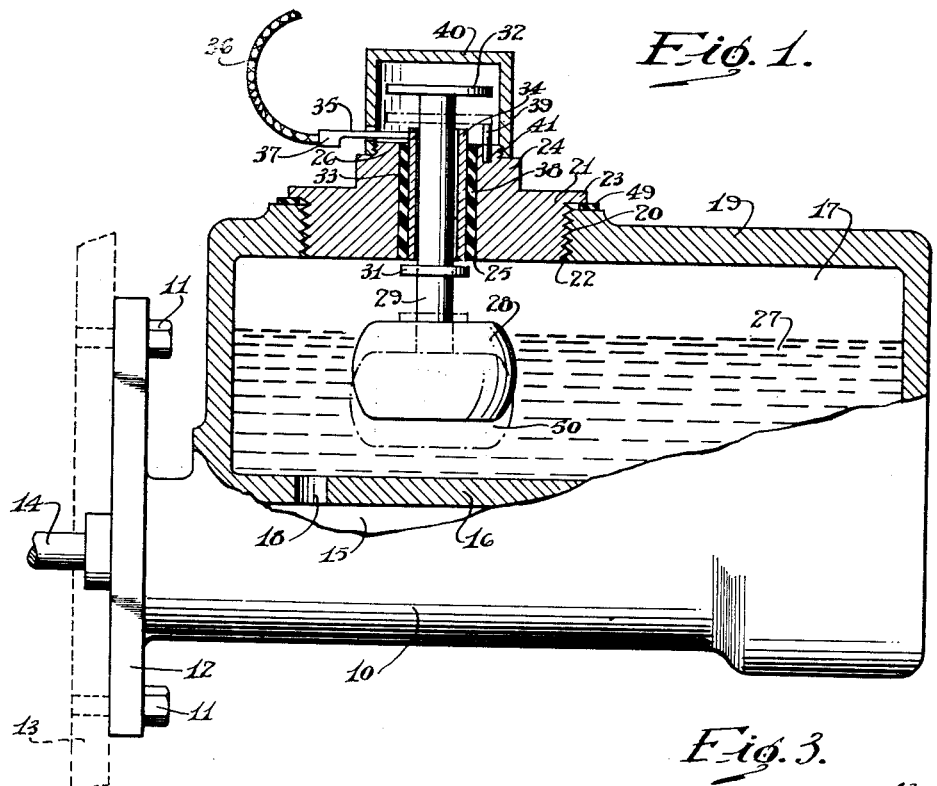
INVENTOR.
James S. Kilpatrick
BY
Cushman Dusby Cushman
ATTORNEYS July 20, 1954  J. S. KILPATRICK  2,684,414
FLUID INDICATOR FOR HYDRAULIC BRAKING SYSTEMS
Filed Jan. 24, 1952  2 Sheets-Sheet 2
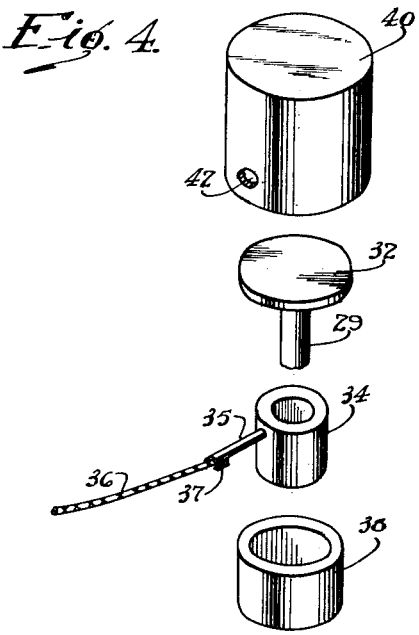
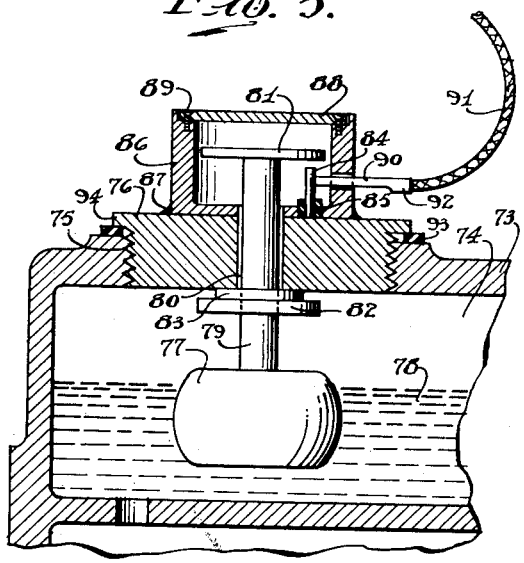
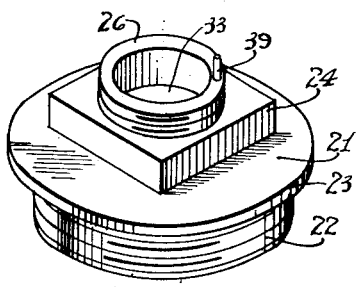
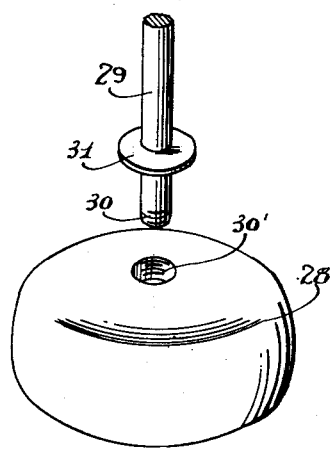
INVENTOR.
James S. Kilpatrick
BY
ATTORNEYS Patented July 20, 1954

2,684,414

UNITED STATES PATENT OFFICE 2,684,414

FLUID INDICATOR FOR HYDRAULIC BRAKING SYSTEMS

James S. Kilpatrick, Jacksonville, Fla.

Application January 24, 1952, Serial No. 267,999

2 Claims. (Cl. 200—84)

The present invention relates to an improved automatically operable signal device arranged to be associated with the hydraulic braking system of a motor vehicle or the like, to indicate when the brake fluid reaches a predetermined low level.

An important object is to provide a simple, efficient, compact and economical float assembly arranged to be operatively connected to a signal device such as a light on the dash of the vehicle, to indicate when the brake fluid in the braking system becomes low in order to insure the safe operation and the maintenance of an adequate supply of brake fluid at all times.

Other objects and advantages of the invention will be apparent from the following description when taken in conjunction with the accompanying claims and drawings:

Referring to the drawings wherein is disclosed several preferred embodiments, the invention may assume:

Figure 1 is a side view with parts in section of a master brake cylinder showing the improved float assembly associated therewith;

Figure 2 is a vertical sectional view of a modified form of the invention;

Figure 3 is an electrical diagram of the wire connections;

Figure 4 is an exploded view showing parts of the float assembly, and

Figure 5 is a vertical sectional view of a further modification.

Referring to the drawings, 10 designates the master cylinder housing of a conventional hydraulically operated brake system which may be connected to a motor vehicle or the like by the retaining bolts 11 which extend through openings in the spaced flanges 12 at one end of the housing so as to be firmly secured to the inside of the dash 13 or other part of the vehicle. A recirprocating piston rod 14 extends into the piston cylinder 15 and is connected with the brake pedal in the usual manner. A transverse partition 16 separates the cylinder 15 from the chamber or brake fluid reservoir 17. The fluid is free to flow from the chamber 17 into the cylinder 15 through a port 18 in the partition 16.

The top 19 of the cylinder 10 is provided with a threaded opening 20 which is closed by plug 21 having a reduced externally threaded portion 22 that engages the threaded wall of the opening 20. The plug 21 is also formed with an annular collar or stop flange 23 and a reduced polygonal tool receiving portion 24 which encloses the centrally disposed vertical opening 25 and terminates in an annular externally threaded collar or boss 26 that extends upwardly therefrom (Fig. 4). Arranged to be submerged in the brake fluid 27 in the chamber 17 is a hollow float 28 made of any suitable light durable metal or the like. Extending through the opening 25 is a shaft or stem 29 of such length as to project downwardly into the chamber 17 so as to have its lower threaded end 30 connected to the threaded end of a central opening 30' in the float 28 (Fig. 4). A combined stop and baffle in the form of an annular collar 31 is non-rotatably connected to the shaft 29 within the chamber 17 so as to limit the upward axial movement of the shaft. The upper end of the shaft 29 extends a limited distance above the top of the plug 21 and is provided with an annular flange or disk 32 that constitutes a combined movable electrical contact and stop. The top of the plug 21 is provided with an enlarged recess 33 which communicates with the opening 25 and is concentric therewith. A metal bushing or sleeve 34 is arranged to be positioned within the recess 33 so that the shaft 29 may extend loosely therethrough. The bushing 34 has extending radially and outwardly therefrom above the plug 21 a metal arm 35 to which a lead wire 36 may be detachably connected as at 37 (Fig. 1). A tubular insulated member or sleeve 38 is positioned in the recess 33 between the wall thereof and the bushing 34. A fixed contact 39 extends upwardly from the top of the plug 21 so as to be positioned in the path of the contact 32 when the latter is moved downwardly. A removable cylindrical cap or cover 40 is preferably provided with an internally threaded lower end portion 41 (Fig. 1) for engaging the complementary threads on the collar 26 so as to enclose and protect the movable contact 32, stationary contact 39 and their associated parts when the float assembly is set up. The cap 40 is provided on one side thereof with an opening 42 (Fig. 4) through which extends the contact arm 35. The flexible wire 36 is connected to one terminal of a lamp socket 43 (Fig. 3) which may be conveniently positioned on the dash adjacent the seat of the driver. A lead wire 44 connects the other terminal of the lamp socket 43 and may be provided with a manually operable switch 45. The lead wire 44 is connected to a battery 46 and the ground 47. The lead 36 is similarly grounded through the cylinder 10 and the lead 48. Between the flange 23 and the top of the cylinder 10 a rubber gasket 49 may be provided in order to form a tight seal when the parts are assembled.

It will be seen that the float assembly is mounted on the plug 21 and is enclosed by the cap 40 so as to provide a unitary and compact structure which may be readily connected or removed from the cylinder 10.

It will be seen that in normal operation the brake fluid 27 in the chamber 10 will assume a level as indicated in Fig. 1 so that the float 28 will maintain the shaft 29 in its upward position and the movable contact 32 will be spaced from the fixed contact 39. When the brake fluid recedes to a predetermined low level or danger mark as indicated by the dotted line position 50 of the float (Fig. 1), the downward movement of the shaft 29 brings the contact 32 in engagement with the fixed contact 39 thus closing an electrical circuit to the light 43 on the dash of the vehicle so as to indicate to the driver or operator that the brake fluid should promptly be replenished in order to avoid the danger of faulty or inadequate brakes.

In the modified form of the invention shown in Fig. 2, the removable plug 51 is arranged to close the opening 52 in the top of the master brake cylinder 53. The plug 51 has a vertical through opening 54 through which loosely extends a reciprocating shaft 55 provided with axially spaced lower and upper flanges or collars 56 and 57 respectively, between which is slidably mounted on the shaft, the hollow float 58 that normally floats on the brake fluid 59 in the chamber 60 so as to assume the position as shown. The top of the plug 51 may be provided with a polygonal tool engaging portion 61 having an annular externally threaded tubular portion 62 extending upwardly therefrom. The plug is also provided with an enlarged recess 63 through which the shaft 55 extends. A metal sleeve 64 extends into the recess 63 and surrounds the shaft 55. The upper portion of the sleeve 64 has extending laterally and outwardly therefrom a contact arm 65 to which is detachably connected one end of a lead wire 66, as at 67. A tubular bushing 68 is positioned in the recess 63 between the sleeve 64 and the wall of the recess. Extending upwardly from the top of the annular portion 62 of the plug 51 is a fixed contact 69. The upper end of the shaft 55 terminates in an annular flange 70 which overlaps the contact 69 and constitutes a movable contact 70 arranged to be brought in engagement with the fixed contact 69 when the shaft is moved downwardly or further into the chamber 60. A coil spring 71 is confined between the top of the bushing 68 and the flange 70 and tends to normally urge and maintain the movable contact 70 away from the fixed contact 69. The parts are enclosed in a removable cap 72 similar in construction to the cap 40 previously described. Normally when the brake fluid 59 in the chamber 60 is at a level as indicated in Fig. 2, the float 58 is buoyantly supported by the fluid and is spaced from both the lower flange 56 and the upper flange 57. The outward tension of the spring 71 now urges the contact 70 away from the contact 69. However, the tension of the spring 71 relative to the weight of the float is such that, when the fluid 59 in the chamber 60 recedes or falls below a predetermined level, the float 58 will drop and engage the lower flange 56 and the weight thereof will be sufficient to contract the spring 71 and move the contact 70 in engagement with the fixed contact 69 so as to establish an electrical circuit to a signal device, such as the light 43 previously described. Conversely, when the chamber 60 is replenished with fluid the float 58 will move to the position as shown so as to be entirely supported by the fluid thus allowing the spring 71 to expand and move the contact 70 away from the contact 69.

In the modification shown in Fig. 5, the cylinder 73 is provided with a brake fluid chamber 74 having an opening 75 closed by the removable plug 76. A metal hollow float 77 is arranged to float in the brake fluid 78 in the chamber and has extending upwardly therefrom an operating shaft or stem 79 that extends loosely through a vertical opening 80 in the plug 76, and terminates at its upper end in an annular flange or disk 81 that is arranged to constitute a removable electrical contact. An annular collar 82 is fixed to the shaft 79 and is positioned within the chamber so as to constitute a stop for limiting the upward axial movement of the shaft 80. A rubber gasket 83 may be interposed between the collar 82 and the bottom of the plug 76 so as to provide a seal for closing the opening 80. A fixed electrical contact 84 extends upwardly from the top of the plug 76 and is embedded in an insulated member 85 carried by a cylindrical housing 86 that is mounted in a fixed position on the top of the plug 76 in any suitable manner such as by welding 87. The housing 86 has an open top which may be closed by a removable lid 88 that fits in a reduced shoulder portion of the top of the housing so as to be detachably secured thereto in any suitable manner such as by the threaded bolts 89. The upper portion of the shaft 79 and the movable contact 81 are positioned in the housing 86 and the fixed contact 84 is in the path of movement of the contact 81. The fixed contact 84 has extending outwardly and laterally therefrom an arm 90 to which a lead wire 91 may be detachably connected as at 92. A rubber gasket 93 may be interposed between the annular collar 94 on the plug 76 and the top of the cylinder so as to provide a seal when the parts are assembled.

It will be seen that normally the brake fluid 78 in the chamber 74 is at such a high level as to raise the shaft 79 so as to space the movable contact 81 away from its associated fixed contact 84. When the brake fluid in the chamber 74 recedes to a predetermined low level it will move the float 77 and shaft 79 downwardly, at the same time the contact 81 is moved in engagement with the contacts 84 so as to establish an electrical circuit with a signal device such as the light 43 previously described.

It will be understood that the forms of the invention shown and described are merely illustrative and that such changes may be made as come within the scope of the following claims.

I claim:

1. In a hydraulic brake system of the class described having in combination, a cylinder provided with an opening in the top thereof, a removable plug for closing said opening, said plug having a central aperture extending vertically therethrough, a reciprocating shaft extending through said aperture into said chamber, a float in said chamber, means connecting said float to one end of said shaft so that the float is axially slidable thereon, the opposite end of said shaft extending above the plug and provided with a lateral projection constituting a movable electrical contact, a fixed electrical contact extending upwardly from the plug and below said projection so as to be engaged by the same when it is lowered, the top of the plug having an enlarged recess concentric with said aperture, a tubular bushing mounted in said recess and enclosing said shaft, said bushing having an electrical contact extending radially and outwardly thereof, an insulated sleeve interposed between said bushing and the inner wall of said recess, a coil spring surrounding said shaft and confined between said projection and said bushing for normally urging the shaft upwardly, and means for electrically connecting said contacts to a signal device so that normally the level of the brake fluid in said chamber supports the float and allows independent axial movement of the shaft relative thereto, but when the brake fluid in said chamber recedes to a predetermined low level, the tension of the spring relative to the weight of the float being such that the weight of the float on the shaft is sufficient to overcome the upper tension of the spring so as to force the shaft downwardly and the movable contact in engagement with the fixed contact so as to close the circuit to the signal device.

2. In a hydraulic braking system of the class described having in combination, a cylinder provided with an opening in the top thereof, a removable plug for closing said opening, said plug having a central aperture extending vertically therethrough, a reciprocating shaft extending through said aperture into said chamber, a float in said chamber, means connecting said float to one end of said shaft so that the float is axially slidable thereon, the end of said shaft extending into the chamber having axially spaced flanges, said float being slidably mounted on said shaft between said flanges, the opposite end of said shaft extending above the plug and provided with an annular collar constituting a movable contact, a fixed electrical contact extending upwardly from the plug and below said collar so as to be engaged by the collar when the latter is lowered, the top of the plug having an enlarged recess concentric with said aperture, a tubular bushing mounted in said recess and enclosing said shaft, said bushing constituting an electrical contact, an insulated sleeve interposed between said bushing and the inner wall of said recess, spring means on said shaft and confined between said collar and said bushing for normally urging the shaft upwardly, and means for electrically connecting said contacts to a signal device so that normally the upward tension of the spring means maintains the movable contact away from the fixed contact, the tension of the spring means relative to the weight of the float being such that said float upon receding of the brake fluid in the chamber below a predetermined level being moved downwardly in engagement with one of said flanges so as to overcome the tension of the spring means and move the shaft axially to bring the movable contact in engagement with the fixed contact and close the circuit to the signal device.

References Cited in the file of this patent

UNITED STATES PATENTS

| Number | Name | Date |
|---|---|---|
| 394,491 | Johns | Dec. 11, 1888 |
| 829,103 | Dixon | Aug. 21, 1906 |
| 1,497,712 | Crandall et al. | June 17, 1924 |
| 1,759,503 | Gerlach et al. | May 20, 1930 |
| 2,161,441 | Vickers | June 6, 1939 |